Aug. 12, 1969

C. B. RICHEY 3,460,630

TRANSPORT ATTACHMENT FOR IMPLEMENTS

Filed Dec. 16, 1965

INVENTOR.
CLARENCE B. RICHEY
BY
Tweedale & Gerhardt
ATTORNEYS.

Aug. 12, 1969  C. B. RICHEY  3,460,630
TRANSPORT ATTACHMENT FOR IMPLEMENTS
Filed Dec. 16, 1965  2 Sheets-Sheet 2

INVENTOR.
CLARENCE B. RICHEY
BY
Tweedale & Gerhardt
ATTORNEYS.

United States Patent Office 3,460,630
Patented Aug. 12, 1969

3,460,630
TRANSPORT ATTACHMENT FOR IMPLEMENTS
Clarence B. Richey, Fresno, Calif., assignor to Massey-Ferguson Inc., Detroit, Mich.
Filed Dec. 16, 1965, Ser. No. 514,231
Int. Cl. A01b 63/16, 21/08, 15/16
U.S. Cl. 172—240                    9 Claims

ABSTRACT OF THE DISCLOSURE

A transport attachment for an offset disc harrow having a pair of hinged disc gangs which are foldable together into parallel relationship when not in use. Transport attachment includes a pair of shafts, one rotatably mounted on the upper side of each disc gang such that when the gangs are in their transport, side by side position, the shafts are in coaxial alignment and can be coupled together to define a rockshaft. Each shaft is provided with a wheel that can be moved between an out of use position during earthworking and a position in which it supports the gangs above the ground for transport.

---

This invention relates generally to apparatus for transporting large machines and the like in trailed relationship behind a towing vehicle, and is particularly concerned with apparatus for transporting agricultural implements such as large, offset disc harrows having long, heavy gangs of tools.

The steady increase in the size and power of agricultural tractors has been accompanied by a corresponding increase in the size of implements for use with the tractors, which in turn has created special problems in transporting such implements from field to field between operations.

In accordance with the present invention, an implement with a pair of members having an operating position with respect to each other, and a storage and transport position, different from the operating position, is provided with a transport assembly that can be stored on the members out of engagement with the ground so as not to interfere with the members in their operating position, but which supports both members as a unit for transport. The transport unit detachably secures the members together in their transport position and swings to a storage position on the implement when the members are in their operative position.

In the preferred embodiment of the invention, the transport attachment is mounted on a large, offset disc harrow having a pair of hinged disc gangs which are foldable together into substantially parallel, side-by-side relationship when not in use. The transport attachment includes a pair of shafts, one rotatably mounted on the upper side of each disc gang beam such that when the gangs are in their transport, side-by-side position, the shafts are in coaxial alignment and can be coupled together to define a rockshaft. Each shaft is provided with a wheel on its end opposite the coupling that is moved upon rotation of its associated shaft between a storage position in which it projects above the gangs out of engagement with the ground, an extended position in which the wheels support the gangs above the ground, and a retracted position to lower the gangs onto the ground in preparation for separation of the gangs to their operative positions. When the shafts are separated, the wheels can be moved to and locked into their storage position so as not to interfere with the earthworking operation. The wheels are also locked in their extended position during transport.

Preferably, a hydraulic ram has one end pivotally mounted on one of the gangs with its other end alternately connectable with either the other gang or with the rockshaft. In the former case, the ram may be extended and retracted to unfold and fold the gangs; and in the latter case, the ram may be extended and retracted to raise and lower the gangs relative to the ground when they are secured together in the transport position.

A further feature of the invention is that the transport attachment can be connected to a towing vehicle in such a manner that when the implement is being towed, the tendency of the front end to dig into the ground when the tractor pitches relative to the implement is substantially eliminated. A tongue is pivotally mounted on the front end of the folded implement for attachment with the tractor drawbar and has a one-way sliding connection with a plate pivotally suspended on the implement. The plate is connected by a link to the rockshaft of the transport attachment such that when the wheels are raised and lowered, the gangs may remain substantially parallel to the ground during their movement. When the wheels are locked in their extended positions for transport, the plate is held against movement relative to the implement such that the tongue cannot pivot upwardly relative to the implement which prevents the forward end of the implement from pitching downwardly about the axis of the wheels and digging into the ground.

Other objects, advantages and features of the invention will become apparent from the following description taken in connection with the accompanying drawings in which:

FIG. 1 is a plan view of an offset disc harrow with the disc gangs in their operative, earthworking position and having a transport attachment embodying the invention;

FIG. 2 is a plan view of the harrow of FIG. 1 with the disc gangs in their folded, or inoperative transport position;

Figure 3:
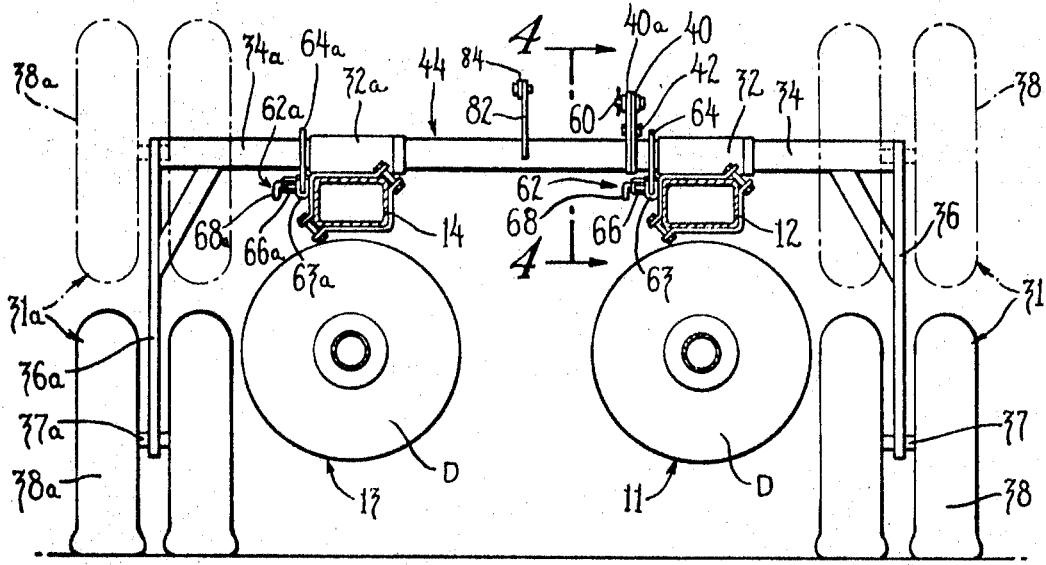
FIG. 3 is a transverse sectional view taken on lines 3—3 of FIG. 2.

In FIG. 1, an offset disc harrow is designated collectively by reference numeral 10 and includes disc gangs 11 and 13 having frame members 12 and 14, respectively. Each of the disc gangs includes a plurality of discs D which are supported on frames 12 and 14. Frames 12 and 14 are connected together by a cross frame member 16 secured to gang frame 12 and pivotally connected by a pin 18 with a collar 20 on frame 14. In FIG. 1, chain 22 is connected between the gang frames 12 and 14 at a point spaced from pivot pin 18 to maintain the proper angular relationship between the gangs during earthworking operations.

Mounted on the forward gang frame 12 is a pair of hitch frames 24 and 26 to which is secured a tow bar 28 for connection with the drawbar 30 of a tractor, or similar draft vehicle (not shown).

Gangs 11 and 13 are provided with transport attachment units 31 and 31a, respectively, of substantially identical construction except for being right and left handed. Therefore, unit 31 is hereinafter described in detail and the corresponding elements of unit 31a are designated by the same reference numerals with the addition of the subscript letter a. Only those parts in unit 31a differing from, or not corresponding to, parts in unit 31 are described in detail.

Mounted on the upper surface of gang frame 12 intermediate its ends, is a sleeve-type bearing 32 in which is rotatably mounted a shaft 34. Secured to the outer end of shaft 34 is an arm 36 having a shaft 37 mounted on its free end which serves as the axle for a wheel assembly 38.

Mounted on the opposed, inner ends of shafts 34 and 34a are shaft coupling members in the form of plates 40 and 40a, respectively. With the gang frames 12 and 14 disposed in their inoperative transport and storage position of FIGS. 2 and 3, coupling plates 40 and 40a are secured together by bolts 32, and shafts 34, 34a define a rockshaft 44.

Plates 40, 40a project radially to define an actuating arm for rockshaft 44 for connection with an extensible and retractable power element 46 in the form of a hydraulic ram having a cylinder 48 pivotally mounted at 50 to a collar 52 on frame 12, and a piston 54 pivotally mounted at 56 to a collar 58 on frame 14. The power element 46 is hydraulically retracted from the position of FIG. 1 to fold the gang frames 12 and 14 together toward their inoperative transport and storage position as shown in FIG. 2. Subsequently, piston 54 may be disconnected from collar 58 and pivotally connected by a pin 60 to plates 40 and 40a for operating rockshaft 44 to raise and lower wheels 38 and 38a relative to the disc gangs.

With the wheels 38 and 38a in their extended positions as shown in FIG. 3, the discs are supported above the ground for transport. When the harrow has been moved to the field for earthworking operations, wheels 38 and 38a are retracted by the power element 46 to cause arms 36 and 36a to swing upwardly about the axis of rockshaft 44 permitting the discs D to engage the ground. Wheels 38 and 38a are then moved out of engagement with the ground to their storage position indicated in phantom lines in FIGS. 3 and 4. Piston 54 is disconnected from coupling plates 40, 40a and connected with collar 58. Bolts 42 are removed to disconnect plates 40 and 40a and subsequent extension of power element 46 moves the discs to their earth-working position indicated in FIG. 1.

Figure 4:
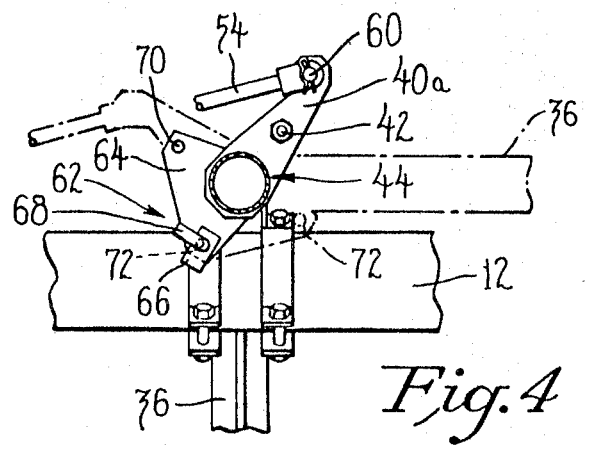
FIG. 4 is a sectional detail view taken on line 4—4 of FIG. 3.

Wheels 38 and 38a can each be locked in either their extended or storage positions by latching assemblies 62 and 62a provided on shafts 34 and 34a. With reference to FIGS. 3 and 4, the latch assembly 62 includes a U-shaped bracket 63 secured to frame 12 and a latching plate 64 mounted on shaft 34 and engageable with the slot defined by the U-shaped bracket 63. A U-shaped support 66 is welded to bracket 64 for a latch pin 68 which is engageable with an opening in the wall of bracket 64 and one of two openings 70 and 72 (FIG. 4) in latch plate 64. When wheel 38 is in its extended position as shown in FIG. 3, pin 68 is engaged with opening 72 to prevent rotation of shaft 34. When the wheel is moved to its storage position as indicated in phantom lines in FIG. 4, pin 68 engages hole 70 to secure shaft 34 against rotation and hold the wheel out of engagement with the ground so as not to interfere with earthworking operations.

In order to connect the implement to the tractor drawbar, which is at a fixed height above the ground, the present transport attachment is provided with a tongue that is freely pivotal in order to easily connect the tongue to the drawbar, but is subsequently connected with the rockshaft in such a manner that the implement is lifted off the ground in a level attitude and remains level during towing.

Figure 5:
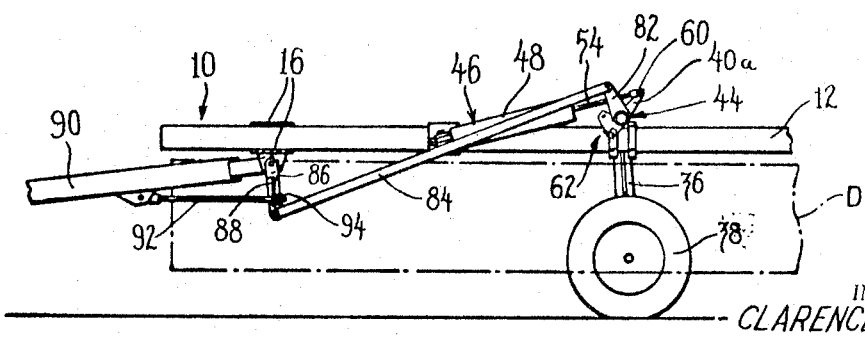
FIG. 5 is a view taken on line 5—5 of FIG. 2.

With reference to FIG. 5, an arm 82 projecting from shaft 40a is pivotally connected through a link 84 with the lower end of a frame 86, the upper end of which is pivotally connected to cross member 16 on its underside. Frame 86 includes a plate member 88 which extends transversely to the direction of travel of the implement. A tongue 90 is pivotally mounted on the implement preferably on the same axis as the upper end of frame member 86 and is connected at its forward end with the drawbar of a tractor (not shown). Pivotally connected to the underside of tongue 90 is a rod 92 which is slidably received in an opening in plate member 88 and is provided with stop members 94 to limit the clockwise pivotal movement of tongue 90 relative to plate 88.

To connect the implement with the tractor drawbar, wheels 38, 38a are retracted, that is, the discs and wheels rest on the ground. Tongue 90 is connected to the tractor drawbar, after which link 84 is secured to arm 82. Subsequent extension of ram 48 extends the wheels and simultaneously carries the front end of the implement to lift off the ground to the position of FIG. 5.

The forward end of the implement 10 can move upwardly with respect to the tractor due to the sliding connection of rod 92 in plate 88, but downward movement is limited by engagement of stop 94 with plate 88. Consequently, should the tractor pitch downwardly relative to the implement, the front end of the discs will not engage the ground since the tongue 90 will pivot downwardly or in a counterclockwise direction. Conversely, should the tractor pitch upwardly or rise relative to the implement, the front end of the implement will pivot upwardly about the axis of rockshaft 44 in a clockwise direction due to the engagement of stop 94 with plate 88 since links 84 restrains plate 86 against movement.

To disconnect the implement from the tractor for earth-working operation, latch pins 68, 68a are withdrawn from holes 72, 72a permitting retraction of power element 46 to rotate rockshaft 44 and said wheels 38, 38a to their retracted position and consequently lower the discs onto the ground. Rockshaft 44 turns in a counterclockwise direction as viewed in FIG. 5 which motion is transmitted through link 84 to frame 86 resulting in counterclockwise rotation of frame 86 about its pivot point permitting the front end (left end in FIG. 5) to lower onto the ground, the disc gangs remaining parallel to the ground during the lowering movement.

With the discs resting on the ground, the wheels can be swung to their storage positions and locked in place by engagement of pins 68, 68a in holes 70, 70a of plates 64, 64a. Removal of bolt 42 permits shafts 34 and 34a to be separated. Tow bar 28 is installed on frames 24 and 26 as indicated in FIG. 1 for connection with the tractor.

While a specific form of the invention has been illustrated and described in the foregoing specification and drawings, it should be apparent to those skilled in the arts that the invention is not limited to the exact construction shown, but that other forms may be adopted by those skilled in the art without departing from the scope and spirit of the invention.

I claim:

1. A transport attachment for an implement having a pair of members movable relative to each other between first and second positions characterized by said transport attachment comprising connecting means carried by at least one of said members connectable with the other of said members when said members are in said second position to secure said pair of members together against relative movement with respect to each other wherein said connecting means includes means defining a rockshaft extending between said members in said second position and being rotatable with respect to said members, and wherein said rockshaft is made up of a pair of shafts, one journalled on each of said members, and wherein said connecting means includes means for coupling said shafts together when said members are in said second position such that rotation of one of said shafts causes corresponding rotation of the other of said shafts, and ground support means carried by said connecting means for selective vertical movement relative to said members between extended and retracted positions to respectively raise and lower said pair of members as a unit relative to the ground by rotation of said rockshaft between its extended and retracted positions.

2. The construction defined in claim 1 wherein said ground support means comprises a pair of wheels, one mounted on each of said shafts on the end thereof opposite said coupling means such that said pair of members are located between said wheels in said second position, said wheels being selectively movable individually when said shafts are uncoupled to a retracted, storage position with respect to its associated member in which position said wheels are supported out of engagement with the ground so as not to interfere with earthworking operations.

3. A transport attachment for an implement having a pair of members movable relative to each other between first and second positions characterized by said transport attachment comprising connecting means carried by at least one of said members connectable with the other of said members when said members are in said second position to secure said pair of members together against relative movement with respect to each other, ground support means carried by said connecting means for selective vertical movement relative to said members between extended and retracted positions to respectively raise and lower said pair of members as a unit relative to the ground, wherein said pair of members comprises a pair of hingedly connected gangs of earthworking tools which in said first position are angularly spread apart about their hinge point for earthworking operation, and in said second position are folded together in substantially parallel, side-by-side relationship for storage and transport, and wherein said connecting means includes means defining a rockshaft extending between said gangs in said second position, said rockshaft being rotatable with respect to said gangs to extend and retract said ground support means.

4. The construction defined in claim 3 wherein said rockshaft is made up of a pair of shafts, one journalled on each of said gangs, and further including coupling means for connecting said shafts to rotate together when said gangs are in said second position, and wherein said ground support means comprises wheel means carried by said rockshaft and movable upon rotation of said rockshaft between extended and retracted positions to simultaneously raise and lower said pair of gangs when said pair of gangs are in said second position, said wheel means being movable to a storage position out of engagement with the ground when said gangs are in the first position supported on the ground for earthworking operations.

5. The construction defined in claim 4 further including means carried by at least one of said disc gangs for selectively locking said wheel means in either its storage or extended positions.

6. The construction defined in claim 3 further including extensible and retractable power means having one end pivotally supported on one of said gangs and its other end alternatively pivotally connectable with either said other gang for moving said gangs between said first and second positions or with said rockshaft for moving said wheel means between its extended, retracted and storage positions when said gangs are in said second position.

7. The construction defined in claim 6 wherein said gangs each include a longitudinal beam beneath which the earthworking tools are supported, and wherein said shafts are each journalled on the upper side of the beam of its associated gang and are movable into coaxial alignment when said gangs are moved into said second position, said coupling means comprising radially extending plates on the opposed, inner ends of said shafts, and including means for securing said plates together to cause said shafts to rotate together, said plates defining a rocker arm for connection with said power means.

8. A transport attachment for an implement having a pair of members movable relative to each other between first and second positions characterized by said transport attachment comprising connecting means carried by at least one of said members connectable with the other of said members when said members are in said second position to secure said pair of members together against relative movement with respect to each other, ground support means carried by said connecting means for selective vertical movement relative to said members between extended and retracted positions to respectively raise and lower said pair of members as a unit relative to the ground, a hitch member for connecting the implement with a draft vehicle, said hitch member being mounted on said implement for pivotal movement about an axis transverse to the common longitudinal axis of said members at a point longitudinally spaced from said ground support means, and means interconnecting said hitch means and connecting means to pull the front of the hitch member relatively downward, resulting in an approximately level lift of the disc.

9. The construction defined in claim 8 wherein said means interconnecting said hitch means and connecting means includes an apertured plate member pivotally suspended on said implement, a rod having one end pivotally connected with said hitch member and its other end slidably received in the apertured plate member, stop means carried by said rod engageable with said plate member for limiting the upward pivotal movement of said hitch member relative to said plate member, and a link connecting said plate with said connecting means to prevent pivotal movement of said plate except in conjunction with said connecting means and ground support means.

References Cited

UNITED STATES PATENTS

| 2,421,772 | 6/1947 | Brundage | 172—240 |
| 2,938,588 | 5/1960 | Stein | 172—240 |
| 3,082,830 | 3/1963 | McKay | 172—328 |

ANTONIO F. GUIDA, Primary Examiner

RONALD C. HARRINGTON, Assistant Examiner

U.S. Cl. X.R.

172—581